United States Patent
Iijima et al.

(10) Patent No.: US 7,615,084 B2
(45) Date of Patent: Nov. 10, 2009

(54) SECONDARY BATTERY, AND ITS PRODUCTION PROCESS

(75) Inventors: Tsuyoshi Iijima, Tokyo (JP); Toshinobu Miyakoshi, Tokyo (JP); Satoshi Maruyama, Tokyo (JP); Makoto Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 1162 days.

(21) Appl. No.: 10/347,744

(22) Filed: Jan. 22, 2003

(65) Prior Publication Data

US 2003/0108797 A1    Jun. 12, 2003

Related U.S. Application Data

(62) Division of application No. 09/506,688, filed on Feb. 18, 2000, now Pat. No. 6,534,219.

(30) Foreign Application Priority Data

Feb. 22, 1999   (JP)   .................................. 11-043441

(51) Int. Cl.
H01M 2/16   (2006.01)
H01M 10/04  (2006.01)

(52) U.S. Cl. ........................ 29/623.5; 29/623.1; 429/306

(58) Field of Classification Search ................. 429/306, 429/316, 217
See application file for complete search history.

(56) References Cited

U.S. PATENT DOCUMENTS

| 5,296,318 | A | | 3/1994 | Gozdz et al. |
| 5,418,091 | A | | 5/1995 | Gozdz et al. |
| 5,460,904 | A | | 10/1995 | Gozdz et al. |
| 5,492,543 | A | * | 2/1996 | Lim .......................... 29/623.1 |
| 5,554,459 | A | | 9/1996 | Gozdz et al. |
| 5,741,609 | A | | 4/1998 | Chen et al. |
| 5,837,015 | A | | 11/1998 | Venugopal et al. |
| 6,218,051 | B1 | * | 4/2001 | Yokohata ..................... 429/249 |
| 6,273,921 | B1 | * | 8/2001 | Stanford et al. ............ 29/623.1 |
| 6,467,156 | B1 | * | 10/2002 | Velasquez et al. ............. 29/730 |

FOREIGN PATENT DOCUMENTS

| EP | 0 892 454 | | 1/1999 |
| EP | 0921529 A1 | * | 6/1999 |
| JP | 5-60226 | | 9/1993 |
| WO | WO 97/48106 | | 12/1997 |

* cited by examiner

*Primary Examiner*—John S Maples
(74) *Attorney, Agent, or Firm*—Oblon, Spivak, McClelland, Maier & Neustadt, L.L.P.

(57) ABSTRACT

A cathode, an anode and a porous film are first provided. Then, the cathode and anode are aligned with the porous film and a part of the cathode and a part of the anode are fixed to said porous film. Then, the cathode, anode and porous film are immersed in a liquid electrolyte. Finally, the cathode and anode are integrated with the porous film by compression. With this process, it is possible to produce a thin and lightweight polymer secondary battery or other secondary batteries with ease yet at low cost.

28 Claims, 2 Drawing Sheets

FIG. 3

SECONDARY BATTERY, AND ITS PRODUCTION PROCESS

This application is a divisional of U.S. Ser. No. 09/506,688, filed 18 Feb. 2000, now U.S. Pat. No. 6,534,219.

BACKGROUND OF THE INVENTION

1. Field of the Invention

The present invention relates to a polymer secondary battery making use of a gelled solid electrolyte or other secondary batteries, and their production process.

2. Prior Art

Various batteries are now used in diverse fields from electronics to automobiles. These batteries, for the most part, contain a liquid electrolyte, and so firm sealing is required for the purpose of preventing electrolyte leakage. In lithium ion secondary batteries having wide applications as driving power sources for portable devices chiefly because of achieving high energy densities, too, firm metal cans are unexceptionally used as battery cans for the purpose of preventing electrolyte leakage. In other words, the lithium ion secondary batteries cannot make full use of their merit contributing to weight reductions. In consideration of the entire spectrum of existing devices, weight reductions and downsizing are an unavoidable problem. In devices utilizing existing lithium ion secondary batteries, however, the whole weight proportion of the batteries in the devices is on the increase. In addition, battery thickness places some limits to the downsizing of the devices. Thus, it is no exaggeration to say that one of keys to the future development of lithium ion secondary batteries is their weight reductions and downsizing.

Situation being like this, lithium polymer secondary batteries are now under development. In a lithium polymer secondary battery there is no free liquid at all with no concern about electrolyte leakage, because a gelled solid electrolyte with a polymer swollen by a liquid electrolyte is used. The lithium polymer secondary battery attracts attention as the coming generation of a battery for some additional reasons that it can be downsized to an ever thinner form, it can be minituarized through lamination, and it can have a high degree of freedom in shape selection. For instance, U.S. Pat. Nos. 5,296,318 and 5,418,091 disclose a gel electrolyte wherein 20 to 70% by weight of a solution with a lithium salt dissolved therein is contained in a copolymer or P(VDF-HFP) of vinylidene fluoride (VDF) and 8 to 25% by weight of propylene hexafluoride (HFP), and a lithium-intercalation battery.

Known for the production of the gelled solid electrolyte are two production processes as explained below.

According to the first production process that is a common process, a liquid electrolyte or the like is mixed with a solution of a polymer dissolved in a solvent. Then, the mixture is coated on a substrate by various coating techniques. Finally, the solvent is volatilized off to obtain a gelled solid electrolyte film. It is also proposed to dissolve a polymer in a liquid electrolyte, and then coating or extruding the solution to obtain a gelled solid electrolyte film. However, liquid electrolytes used for electrochemical devices are generally lacking an affinity for water. When the gelled solid electrolyte is industrially produced using these processes, therefore, all process steps must be maintained in a dry atmosphere of the order of the dew point minus 30° C., resulting in some considerable capital investment and maintenance spending.

The second process is typically set forth in U.S. Pat. No. 5,418,091. According to this process, a plasticizer is added to a polymer solution, which is in turn coated on a substrate. Thereafter, the solvent is volatilized off for film preparation. The plasticizer is then extracted from the film to form a porous film. Finally, pores formed by the extraction of the plasticizer are impregnated with a liquid electrolyte. When a battery is produced by making use of this process, a cathode and an anode are first stacked on upon another with the plasticizer-containing porous film interleaved between them. Then, a collector is stacked on and thermocompressed to the electrode assembly to form a multilayer structure. Finally, the porous film is gelled by the extraction of the plasticizer and impregnation with the electrolyte. With this process, capital investment and maintenance spending can be greatly cut down because all steps prior to the electrolyte impregnation step can be carried out in ordinary environments. In addition, the porous films can be easily placed under inventory control because the porous films after coating and drying or the extraction of the plasticizer can be stocked in a film state. For this process wherein the porous film is impregnated with the electrolyte while it is intercalated in the multilayer structure, however, an electrolyte-permeable expanded metal must be used for the collector that is the outermost layer of the structure. The "expanded metal" used herein is understood to refer to a metal sheet with a number of pores formed therein. The expanded metal, because of being susceptible to deformation by external force when it is thin, must have a certain thickness for use with a battery. A problem with a lithium polymer secondary battery using the expanded metal is therefore that it is heavier than a lithium secondary battery using a liquid electrolyte, saving the weight of a battery can. For a battery arrangement wherein the expanded metal comes into direct contact with electrodes, an electrically conductive coating material with a conductive agent dispersed in a resin must be coated on the expanded metal, as typically set forth in U.S. Pat. No. 5,554,459, because it is impossible to ensure uniform electrical connection between both. Moreover, the use of the expanded metal gives rise to non-uniform pressure profiles upon thermocompression. This, combined with the low strength of the gelled solid electrolyte, causes many internal shorting upon thermocompression, offering an obstacle to mass production.

As explained above, the prior art production processes of lithium polymer secondary batteries have some grave problems. These problems are a leading reason why polymer secondary batteries cannot be put to practical use although many years have passed since their proposal. For industrial utilization of lithium polymer secondary batteries, it is thus an important challenge to establish a reasonable production process, although various material problems are of course important.

In view of such situations as mentioned above, one object of the invention is to provide a process that enables a thin and lightweight polymer secondary battery or other secondary battery to be produced easily yet at low cost. Another object of the invention is to provide a secondary battery produced by this production process.

SUMMARY OF THE INVENTION

These objects are achievable by the inventions as defined as (1) to (8) hereinbelow.

(1) A process of producing a secondary battery comprising steps of providing for a cathode, an anode and a porous film, aligning said cathode and said anode with said porous film and fixing a part of said cathode and a part of said anode to said porous film, immersing said cathode, said anode and said porous film in a liquid electrolyte, and integrating said cathode and said anode with said porous film by compression.

(2) The secondary battery production process according to (1) above, wherein said porous film contains a polymer, at least a part of which is gelled by immersion in said liquid electrolyte into a solid electrolyte.

(3) The secondary battery production process according to (1) or (2) above, wherein each of said cathode and said anode contains as a binder for binding together an electrode active substance a polymer, at least a part of which is gelled by immersion in said liquid electrolyte.

(4) The secondary battery production process according to any one of (1) to (3) above, wherein said cathode and said anode contain polyvinylidene fluoride as a binder for binding together an electrode active substance.

(5) The secondary battery production process according to any one of (1) to (4) above, wherein a hot-melt adhesive is used when fixing a part of said cathode and a part of said anode to said porous film.

(6) The secondary battery production process according to any one of (1) to (5) above, wherein said cathode and said anode are integrated with a collector comprising a metal foil.

(7) A secondary battery production process as claimed in any one of (1) to (6) above, which is used for production of a lithium ion secondary battery.

(8) A secondary battery produced by a process as claimed in any one of (1) to (7) above.

EMBODIMENTS OF THE INVENTION

The inventors conducted experimentation wherein a metal foil was used as a collector for the purpose of reducing the weight and thickness of a polymer secondary battery and dispensing with the step of coating an electrically conductive coating material on the collector. In this experiment, a polymer-containing porous film and a polymer-containing cathode-anode formed on the metal foil collector were integrated together by thermocompression, followed by impregnation with a liquid electrolyte. Consequently, it was found that it was impossible to achieve sufficient gelation of the polymer.

From this result, it was found that when the metal foil collector was used, it was required to carry out the impregnation with a liquid electrolyte prior to thermocompression. For the thermocompression of the porous film, cathode and anode using polymers, it is required to incorporate a plasticizer therein. As is the case with the process set forth in U.S. Pat. No. 5,418,091, the use of the plasticizer that should be extracted after thermocompression leads to a need of carrying out the impregnation with a liquid electrolyte after the extraction of the plasticizer, i.e., after thermocompression. For this reason, thermocompression was carried out after the polymer had been pre-impregnated with a liquid electrolyte and gelled while the liquid electrolyte was used as a plasticizer. More specifically, the metal foil collector, the electrodes coated thereon and a sheet form of porous film prior to being impregnated with the liquid electrolyte were punched out to given sizes. Following this, the parts were each impregnated with the liquid electrolyte, and then thermocompressed together. Consequently, it was found that a polymer secondary battery having satisfactory properties could be obtained.

However, when the porous film used as a separator and the electrodes were individually impregnated with a liquid electrolyte and gelled, it was difficult to align them with one another for stacking or lamination and it was very difficult to handle the porous film decreased in strength upon gelation. Thus, mass production was substantially unfeasible. Here an account is given of why accurate cathode vs. anode alignment is required for stacking the electrodes one upon another. Usually in a lithium ion secondary battery, an anode is larger in size than a cathode so that the cathode can be completely covered with the anode as seen from the stacking direction. This is because unless the anode is positioned in opposition to the cathode, then lithium ions released from the cathode are precipitated without being entrapped in the anode, resulting in battery capacity decreases. It is thus required to accurately determine the relative position of both electrodes in such a way as to align the anode with the cathode in an accurate opposite relation to each other.

Figure 1:
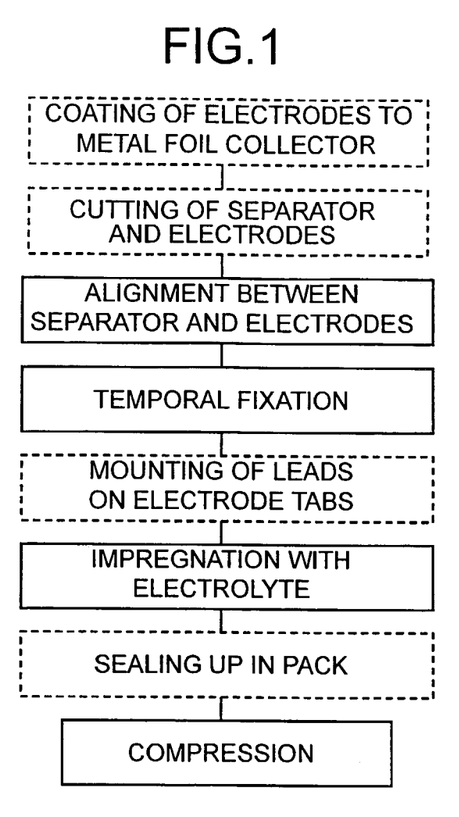
FIG. 1 is a flow chart illustrative of the production process according to the invention.

On the basis of the results of experimentation, the present invention is carried out according to the process steps shown in FIG. 1. As can be seen from FIG. 2, a cathode 3 and an anode 4 are each aligned with a porous film 2 before impregnated with a liquid electrolyte and a part of cathode 3 and a part of anode 4 are each fixed to porous film 2. This fixation is a temporal fixation. For instance, only the central areas of cathode 3 and anode 4 are fixed to porous film 2 by means of an adhesive agent 5, etc., so that the liquid electrolyte can make easy entrance from between cathode 3 and porous film 2 and anode 4 and porous film 2. Consequently, it is possible to use metal foils as a collector 31 for cathode 3 and a collector 41 for anode 4 and, hence, to reduce battery weight and thickness. Further, the use of metal foil collectors can dispense with the application of an electrically conductive coating material to the collectors, thereby simplifying the process. Furthermore, the use of metal foil collectors makes non-uniform pressure profiles unlikely to occur upon thermocompression, thereby preventing occurrence of any internal shorting. To add to this, it is unnecessary to separately handle the porous film decreased in strength upon impregnated with the liquid electrolyte.

When the temporal fixation is carried out by means of an adhesive, it is preferred that the spot to be coated with the adhesive be reduced as much as possible and the area to be coated with the adhesive be again reduced as much as possible, because the adhesive is likely to hinder the diffusion of lithium ions and the entrance of the liquid electrolyte. For instance, it is preferable to apply the adhesive to only one spot on the center of a coating application surface of the porous film or electrodes. The ratio of the area to be coated with the adhesive relative to the whole surface to be coated may be determined depending on the type of adhesive and the whole area to be coated in such a way that adhesion strength sufficient for preventing any possible misalignment is obtainable. Usually, however, it is preferable to make a selection from the range of 0.001% by area to 1% by area.

The adhesive used for the temporal fixation should preferably be a hot-melt adhesive. Any desired hot-melt adhesive may be used provided that it can bond the electrodes to the porous film and has a melting point lower than that of the polymer that is a constituent of the electrodes or porous film. For such a hot-melt adhesive, for instance, an ethylene-mathacrylic acid copolymer may be used.

In the practice of the invention, it is noted that the temporal fixation may be carried out by means other than the adhesive. For instance, it is acceptable to temporally fix the electrodes to the porous film by aligning the cathode and anode with the porous film and stacking them one upon another, and then piercing fixing means such as pins, screws or bolts through the vicinity of the center of the assembly. These fixing means may be removed after thermocompression. If they have no adverse influence on battery properties, however, it is then acceptable to leave them in the battery assembly.

In the present invention, it is preferable that the porous film formed into a solid electrolyte is integrated with the cathode and anode by means of thermocompression. However, it is understood that such integration may be carried out by compression with no application of heat.

No particular limitation is imposed on the porous film used herein as well as its production process. In other words, use may be made of porous films produced by various production processes inclusive of those set forth in "Microporous Polymers and Their Possible Applications" published by Toray Research Center on Jan. 1, 1997.

For instance, it is acceptable to make pores in a plasticizer-containing polymer and extract a plasticizer from the pores before the polymer is impregnated with a liquid electrolyte, as set forth in U.S. Pat. No. 5,418,091. Preferably in this case, the plasticizer is extracted from the pores before the electrodes are temporally fixed to the porous film.

For instance, the porous film-forming polymer may comprise polymer particles and a polymer binder for binding them together, because the liquid electrolyte can be well incorporated into the polymer binder without recourse to any plasticizer, so that not only can the production process be simplified but sufficiently high ion conductivity can also be obtained. For the polymer particles it is preferable to use polyvinylidene fluoride (hereinafter referred to as PVDF for short) particles, and for the polymer binder it is preferable to use a copolymer comprising a vinylidene fluoride unit.

As already explained, the conventional gelled solid electrolyte is obtained by forming a multiplicity of pores in a high-molecular substance using a plasticizer and gelling the high-molecular substance by impregnation with a liquid electrolyte; that is, both the electrolyte in the pores and the electrolyte absorbed in the high-molecular substance contribute to ion conduction. In the polymer particle-containing gelled solid electrolyte preferably used in the practice of the invention, on the other hand, a three-dimensional pore network is formed by the polymer particles bound together by the polymer binder, so that the gelled solid electrolyte can be formed by the liquid electrolyte held in the pores. These pores have usually a diameter larger than that of the pores in the conventional gelled solid electrolyte. The polymer particles and polymer binder may or may not be swollen with the liquid electrolyte. The gelled solid electrolyte with pores defined by the polymer particles is of sufficient liquid retention equivalent to that of the conventional gelled solid electrolyte having pores formed by use of a plasticizer and comprising a PVDF copolymer, and so ensures that ion conductivity is achieved on the same level as could be obtained so far in the art. In addition, the gelled solid electrolyte according to the invention is particularly excellent in rate performance; discharge capacity decreases are limited even with an increased discharge current. Thus, it is possible to achieve a battery having a discharge rate equal to or greater than that of a battery using the conventional gelled solid electrolyte.

The gelled solid electrolyte making use of polymer particles is higher in strength than the conventional gelled solid electrolyte, so that it can be formed into a much thinner sheet that, for instance, has a thickness of up to 60 μm, especially up to 40 μm, and often up to 15 μm. This gelled solid electrolyte is less susceptible to deformation by external force, and so makes cathode-anode shorting unlikely to occur. The gelled solid electrolyte is favorable for mass production because of being high in both tensile strength and bending strength. Usually, a slurry with the polymer dissolved and dispersed therein is coated on a substrate (carrier film) and a solvent is evaporated off to prepare a polymer film. The polymer film containing polymer particles is less susceptible to elongation even upon stretched and to breakdown even upon bent, and so can be separated from the carrier film and rolled up in the course of production.

In addition, the polymer particles rather than inorganic particles are incorporated in the film, thereby making the film more porous, and so the polymer film can be much more reduced in weight than could be achieved by the incorporation of inorganic particles.

In the polymer particle-containing gelled solid electrolyte, a PVDF copolymer inferior in heat resistance and chemical resistance is used for the binder alone. Thus, the amount of the PVDF copolymer used is much smaller than that in the case of the conventional gelled solid electrolyte. This is the reason the polymer particle-containing gelled solid electrolyte is high in storability at high temperatures (of up to about 85° C.) and extremely limited in terms of capacity deterioration with no or little risk of internal shorting. In addition, the polymer particle-containing gelled solid electrolyte is improved in terms of charge-and-discharge performance at high temperatures.

The aforesaid U.S. Pat. No. 5,418,091 shows that to improve the degree of impregnation by making the film porous, 20% by weight of a filler comprising alumina or silica is mixed with the high-molecular solid electrolyte. Nonetheless, this solid electrolyte, because of containing a plasticizer, is lower in strength than the polymer particle-containing solid electrolyte, and so cannot be formed to a thin film with a great likelihood of shorting. The use of the inorganic filler for strength improvements also leads to a weight increase problem. Moreover, the method for the extraction of the plasticizer set forth in the publication has a great demerit while productivity and mass productivity are taken into account.

When a pore-forming plasticizer such as DBP is utilized, the liquid electrolyte penetrates through pores formed by the extraction of the plasticizer and held therein, and so there is no large difference in the volume of the polymer between before the extraction of the plasticizer and after the impregnation with the liquid electrolyte. When no pore-forming plasticizer is used, on the contrary, the polymer swells relatively largely upon impregnation with the liquid electrolyte. On the other hand, the metal foil collector does not swell even upon immersion in the liquid electrolyte. In the case of an electrode wherein a polymer is used as the binder for binding an active substance together and no pore-forming plasticizer is used, warpage occurs when the electrode is formed on only one side of the metal foil collector. To reduce this warpage at least in the case of an electrode of the single-coated type formed on one side of the metal foil, it is preferable to use as the binder PVDF (homopolymer) less susceptible to swelling by a liquid electrolyte.

The present invention is suitable for the production of a lithium ion secondary battery.

The porous film, electrodes and liquid electrolyte according to the invention will now be explained in further details.

Porous Film

The porous film used herein may be composed substantially singly of a polymer that is gelled upon impregnation with a liquid electrolyte, as in the case of a separator in a conventional polymer secondary battery. As already explained, however, it is preferable that the porous film comprises polymer particles and a polymer binder for binding them together. More specifically, the polymer binder is present on a point of contact of one polymer particle with another, where the polymer particles are bound together. The polymer binder may be present on the periphery of each polymer particle, or the polymer particles may coagulate. In the porous film, the polymer particles form a three-dimensional network comprising a multiplicity of pores in which the liquid electrolyte enter and are then held in place.

The porous film should preferably be prepared in the following manner.

First of all, the polymer particles are dispersed in a solvent and the polymer binder is dissolved therein. More exactly, a mixture of the polymer binder with the polymer particles is added to the solvent. Alternatively, the polymer particles are added to a solution of the polymer binder previously dissolved in the solvent. Then, the polymer particles are dispersed and dissolved in the solvent at room temperature or with the application of heat thereto, using a stirring machine such as a magnetic stirrer or a homogenizer and a dispersing machine such as a pot mill, a ball mill, a super-sand mill or a pressure kneader.

For the solvent used herein, a suitable selection may be made from various solvents in which the polymer particles are insoluble and the polymer binder is soluble. Industrially, it is preferable to use solvents having a high boiling point and great safety. For instance, it is preferable to use N,N-dimethylformamide (DMF), dimethylacetamide, acetone, methyl ethyl ketone (MEK), and methyl isobutyl ketone. The concentration of the binder in the solution should preferably be between 5% by weight and 25% by weight.

Preferably in the practice of the invention, the aforesaid solvent in which the polymer particles are insoluble and the polymer binder is soluble is used as a first solvent and a second solvent in which both the polymer particles and the polymer binder are insoluble is added to the first solvent. In such a solvent mixture, the second solvent should preferably have a boiling point higher than that of the first solvent. When such a boiling point difference relation is satisfied, the evaporation of the first solvent is followed by the evaporation of the second solvent, so that much higher porosity can be achieved, resulting in an increase in the amount of the liquid electrolyte to be retained and, hence, property improvements. Preferably in this case, the boiling point difference between both solvents should be between about 20° C. and about 100° C.

When, for instance, PVDF is used for the polymer particles and the PVDF polymer, preferably a vinylidene fluoride-hexafluoropropylene (HFP) copolymer or P(VDF-HFP) is used for the polymer binder, ketones such as acetone and methyl ethyl ketone (MEK) are preferable for the first solvent and toluene, xylene, butanol, isopropyl alcohol, hexane, etc. are preferable for the second solvent. It is here to be noted that the first and second solvents are of high compatibility with each other.

In the solvent mixture, the weight ratio (of the first solvent: the second solvent) should be preferably between 95:5 and 60:40, and more preferably between 85:15 and 75:25. When the proportion of the second solvent is low, the effect on property improvements becomes slender. When the proportion of the second solvent is high, on the other hand, the polymer binder is less susceptible to dissolution in the solvent mixture.

In the practice of the invention, a slurry with the polymer particles dispersed therein and the polymer binder dissolved therein is first obtained. Then, this slurry is coated on a carrier film. Alternatively, the slurry is cast or otherwise formed into a film. For the carrier film used herein, any desired smooth carrier film may be used. For instance, use may be made of resin films such as polyester film and polytetrafluoroethylene film, and glass sheets. No special limitation is imposed on means for coating the slurry on the carrier film; a suitable selection may be made therefrom depending on the quality, shape, etc. of the carrier film. For instance, use may made of dip coating, spray coating, roll coating, doctor blade coating, gravure coating and screen printing techniques. If required after coating, the carrier film may be rolled as by a plate press or calender roll.

By evaporating the solvent from the slurry after coating, it is possible to obtain a polymer film with the polymer particles bound together by the polymer binder. For the evaporation of the solvent, drying under reduced pressure, air-drying, thermal drying, etc. may be used.

After drying, the carrier film is released off. When a porous resin film is used as the carrier film, however, this carrier film may be used without being released off. A porous resin film to which a polymer film capable of gelling is deposited, too, may be used as the porous film in the invention. For the porous resin film used herein, for instance, use may be made of a polyolefin film used as a separator in ordinary lithium secondary batteries.

Then, the polymer film is impregnated with the liquid electrolyte, thereby obtaining a porous film comprising a gelled solid electrolyte.

The polymer particles used herein should preferably have an average particle size of 0.1 to 0.5 µm, and especially 0.1 to 0.4 µm. The use of such particles ensures proper pore diameter and porosity, and so the polymer film can be well impregnated with the liquid electrolyte, resulting in improved properties. Too small an average particle size often causes retention of the liquid electrolyte to become insufficient because the particles are too closely packed. On the other hand, too large an average particle size often offers an obstacle to making the polymer film thin. The size distribution of the polymer particles should preferably be as narrow as possible, because uniform pore diameters can then be obtained.

Usually, the polymer particles should preferably have a spherical shape; however, no particular limitation is placed on their shape provided that proper pores can be obtained. For instance, the polymer particles may have a spheroidal or other shape.

No particular limitation is imposed on the material constituting the polymer particles with the exception that it must be insoluble in the solvent used for production; however, it is preferable to use a material of excellent heat resistance and chemical resistance. For instance, use may be made of PVDF, phenol resin, epoxy resin, latex, acrylo-nitrile•butadiene latex and urethane resin, among which PVDF homopolymers are particularly preferred. These materials may be used alone or in combination of two or more. In view of material strength, the polymer particle-constituting material should preferably a weight-average molecular weight, Mw, of at least about $1.0 \times 10^5$ and especially at least about $3.0 \times 10^5$. In this respect, it is noted that the upper limit to Mw is usually of the order of $1.0 \times 10^6$.

Such polymer particles are commercially available. For instance, PVDF particles are sold under the trade names of "Kynar Flex 741", "Kynar Flex 731", "Kynar Flex 761" and "FORAFLON 1000", all by Atchem, Co., Ltd.; "KF Series" made by Kureha Chemical Industry Co., Ltd.; and "Solef 1000 Series" and "Solef 6000 Series", all by Solvay & Cie. For instance, phenol resin particles are sold under the trade names of "Univex" by Unitika Ltd., and "ACS Series" by Sumitomo Jules Co., Ltd.; latex particles under the trade name of "Nipol LX513" by Nippon Zeon Co., Ltd.; and urethane resin particles under the trade names of "Perknock CFB" by Dainippon Ink & Chemicals, Inc., and "Techpolymer UB" by Sekisui Chemical Co., Ltd.

No particular limitation is imposed on the polymer binder with the exception that it can be dissolved in the solvent used for production; however, it is preferable to use a fluorine type polymer, and especially a copolymer containing a vinylidene fluoride unit.

Preferable for the fluorine type polymer are, for instance, vinylidene fluoride-hexafluoropropylene (HFP) copolymer or P(VDF-HFP), vinylidene fluoride-chlorotrifluoroethylene (CTFE) copolymer or P(VDF-CTFE), vinylidene fluoride-tetrafluoroethylene-hexafluoropropylene fluororubber or P(VDF-TFE-HFP) and vinylidene fluoride-tetrafluoroethylene-perfluoroalkylvinyl ether fluororubber. The composition range of vinylidene fluoride-hexafluoropropylene fluororubber, and vinylidene fluoride-tetrafluoroethylene-hexafluoropropylene fluororubber roughly comprises a composition of VDF-HFP bipolymer having a VDF content of 50 to 85 mol % plus 0 to 35 mol % of TFE. The vinylidene fluoride polymer should preferably have a vinylidene fluoride content of at least 50% by weight, and especially at least 70% by weight (with the upper limit being of the order of 97% by weight). Particular preference is given to the vinylidene fluoride-hexafluoropropylene copolymer or P(VDF-HFP) and vinylidene fluoride-chlorotrifluoroethylene copolymer or P(VDF-CTFE), with P(VDF-HFP) being most preferred. In the practice of the invention, either a polymer having high swelling properties or a polymer having low swelling properties may be used. However, the polymer having low swelling properties is difficult to handle and poor in workability due to its low solubility. With the polymer having high swelling properties, on the other hand, much more excellent characteristics can be obtained, because this polymer can be easily impregnated with the liquid electrolyte and can retain it easily.

Such vinylidene fluoride polymers are commercially available. For instance, the VDF-CTFE copolymer is sold under the trade names of "Cefral Soft G15, G180" by Central Glass Co., Ltd. and "Solef 31508" by Japan Solvey & Cie., and the VDF-HFP copolymer under the trade names of "Kynar Flex 2750 (VDF:HFP=85:15 wt %)", "Kynar Flex 2801 (VDF:HFP=90:10 wt %)" and "Kynar Flex 2851 (VDF:HFP=95:5 wt %)", all by Elf•Atchem Co., Ltd., and "Solef 11008", "Solef 11010", "Solef 21508" and "Solef 21510", all by Japan Solvay & Cie.

The polymer binder should preferably have a weight-average molecular weight, Mw, of $1.0 \times 10^5$ to $1.0 \times 10^6$, and especially $3.0 \times 10^5$ to $8.0 \times 10^5$.

The weight ratio of the polymer particles and the polymer binder (polymer particles:polymer binder) should be preferably between 70:30 and 98:2, more preferably between 75:25 and 95:5, and even more preferably between 80:20 and 93:7. As the ratio of the polymer binder becomes high, it is difficult to obtain proper pores and porosity and, hence, to obtain high performance. As the ratio of the polymer binder becomes low, it is difficult to bind together the polymer particles to a sufficient level and, hence, to obtain sufficient sheet strength and make the sheet thinner.

Usually in the practice of the invention, the porous film is obtained in a sheet form. The sheet form of porous film should have a thickness of preferably 5 to 100 μm, more preferably 5 to 60 μm, and even more preferably 10 to 40 μm, as measured before impregnated with the liquid electrolyte. The polymer particle-containing porous film, because of having high strength, can provide a thin sheet. In other words, the sheet can be thinner than a conventional gelled solid electrolyte sheet that could not practically have a thickness of 60 μm or less. Moreover, the sheet can be thinner than a separator (of generally about 25 μm in thickness) used with a solution type lithium ion battery. This makes a great contribution to one advantage of using the gelled solid electrolyte, i.e., downsizing with a large area.

The porous film should preferably have a porosity of at least 35% as measured in a dry state before impregnated with the liquid electrolyte. At too low a porosity, it is difficult to sufficiently retain the liquid electrolyte, resulting in an ion conductivity or rate performance drop. The porosity should be preferably 90% or lower. At too high a porosity, strength becomes insufficient. It is here noted that the porosity may be measured by the Archimedes method.

The porous film should preferably have an average pore diameter of 0.005 to 0.5 μm, and especially 0.01 to 0.3 μm. When the average pore diameter is larger than 0.5 μm, there is a possibility that lithium dendrite may occur at the anode due to biased currents. When the average pore diameter is smaller tan 0.005 μm, on the other hand, a problem may arise in conjunction with the diffusion of lithium ions. The pore diameter may be measured by a mercury porosimeter.

In the practice of the invention, it is preferable to use such a polymer particle-containing porous film as explained above. However, it is acceptable to use a polymer particle-free porous film as in the prior art. For the polymer particle-free porous film, a suitable selection may be made from polymer binders, etc. that can be gelled by impregnation with the liquid electrolyte and can be compressed or thermocompressed onto electrodes while stacked thereon. Preferably in this case, a plasticizer, for instance, dibutyl phthalate (DBP) is incorporated in the polymer particle-free porous film as mentioned above, thereby forming pores in the porous film.

Electrodes

For the electrodes used herein, a suitable selection may be made from those known so far in the art; however, it is preferable to use an electrode comprising an electrode active substance and a polymer behaving as a binder for binding the active substance together, if required, with an electrical conduction aid. For the polymer used as the binder, it is preferable to use a polymer that can be converted to a gelled solid electrolyte by impregnation with a liquid electrolyte.

When a lithium ion battery is produced, for instance, it is preferable that the anode active substance is selected from carbonaceous materials, lithium metals, lithium alloys and oxide materials and that the cathode active substance is formed of oxides or carbonaceous materials capable of intercalating and de-intercalating lithium ions.

For the carbonaceous materials herein used as the electrode active substance, for instance, a suitable selection may be made from mesocarbon microbeads (MCMB), natural or manmade graphites, resin-fired carbonaceous materials, carbon blacks and carbon fibers.

For the oxides capable of intercalating and de-intercalating lithium ions, lithium-containing composite oxides are preferable. For instance, mention is made of $LiCoO_2$, $LiMn_2O_4$, $LiNiO_2$ and $LiV_2O_4$. These oxides should preferably be used in a powder form having an average particle size of the order of 1 to 40 μm.

If required, an electrical conduction aid is added to the electrode. For the conduction aid, for instance, it is preferable to use carbonaceous materials such as graphites, carbon blacks and carbon fibers, and metals such as nickel, aluminum, copper and silver, with graphites and carbon blacks being particularly preferred.

The electrode should preferably have a composition comprising an active substance, a conduction aid and a gelled solid electrolyte at 30 to 90:3 to 10:10 to 70 for the cathode, and comprising an active substance, a conduction aid and a gelled solid electrolyte at 30 to 90:0 to 10:10 to 70 for the anode, all in weight ratio. No particular limitation is imposed on the type of the polymer herein utilized as the gelled solid electrolyte; for instance, a suitable selection may be made from such polymers as mentioned with reference to the porous film. To prevent warping of the electrode, however, it is preferable to use PVDF (homopolymer) as already mentioned.

In the practice of the invention, it is acceptable to use as the electrode binder a polymer that is not gelled by impregnation with the liquid electrolyte. For instance, a selection may be made from some fluoride resins and fluororubber that are not gelled. Preferably in this case, the binder should account for about 3 to 30% by weight of the whole electrode.

For electrode fabrication, the active substance, if required together with the conduction aid, is first dispersed in a binder solution to prepare a coating solution. Then, the coating solution is coated on a collector. No particular limitation is imposed on coating means; a suitable selection may be made depending on the quality, shape, etc. of the collector. In general, however, it is preferable to use metal mask printing, electrostatic coating, dip coating, spray coating, roll coating, doctor blade coating, gravure coating and screen printing techniques. If required after coating, the collector is rolled as by a plate press or calender roll.

The quality and shape of the collector may be determined depending on battery shape, how to set the collector in a case, etc. Generally, aluminum is used for the cathode and copper or nickel is used for the anode. The effect of the invention is enhanced when the metal foil is used for the collector as already mentioned. If required, however, it is acceptable to use a metal mesh for the collector.

By the evaporation of the solvent after coating, the electrode integrated with the collector is obtained. The coating should preferably have a thickness of the order of 50 to 400 µm.

Electrolyte

The liquid electrolyte used herein is a non-aqueous type electrolyte in which an electrolyte salt is dissolved in an organic solvent. In consideration of application to a lithium ion secondary battery, it is required that lithium be contained in the electrolyte salt. For the lithium-containing electrolyte salt, for instance, use may be made of $LiPF_6$, $LiClO_4$, $LiBF_4$, $LiAsF_6$, $LiSO_3CF_3$ and $LiN(CF_3SO_2)_2$. These electrolyte salts may be used alone or in combination of two or more.

For the organic solvent, any desired organic solvent may be used provided that it is well compatible with the polymer contained in the porous film or electrode and the electrolyte salt. In consideration of application to a lithium ion secondary battery, however, it is preferable to use an organic solvent that is not decomposed even when high voltage is applied thereto. For instance, it is preferable to use carbonates such as ethylene carbonate (EC), propylene carbonate (PC), butylene carbonate, dimethyl carbonate (DMC), diethyl carbonate and ethyl methyl carbonate; cyclic ethers such as tetrahydrofuran (THF) and 2-methyltetrahydrofuran; cyclic esters such as 1,3-dioxolane and 4-methyldioxolane; lactones such as γ-butyrolactone; sulfolane; 3-methylsulfolane; dimethoxyethane, diethoxyethane, ethoxymethoxymethane and ethyldiglyme. These solvents may be used alone or in combination of two or more.

The concentration of the electrolyte in the liquid electrolyte should preferably be 0.3 to 5 mol/l. Usually, the electrolyte shows the highest conductivity in the vicinity of 1 mol/l.

The liquid electrolyte should preferably account for 30 to 70% by weight, and especially 40 to 60% by weight of the gelled solid electrolyte. Too much liquid electrolyte means that the proportion of excessive electrolyte increases, resulting in an adverse influence on the battery to be produced. Too little makes it difficult to obtain sufficient ion conductivity.

It is here understood that the present invention is particularly effective for the production of a polymer secondary battery, i.e., a secondary battery in which a porous film contains a polymer, at least a part of which is gelled by immersion in a liquid electrolyte to a solid electrolyte. However, the present invention is also applicable to other secondary batteries. In other words, it is acceptable to use a porous film that is not gelled, e.g., a polyolefin porous film used as a separator in an ordinary lithium ion secondary battery. Even in this case, a cathode, an anode and a porous film can be immersed in a liquid electrolyte while they are temporally fixed together, and so impregnation with the liquid electrolyte can be easily carried out while any cathode vs. anode misalignment is prevented.

When the electrode binder contains a polymer that is gelled by impregnation with the liquid electrolyte, difficulty is involved in electrode alignment due to an electrode strength decrease upon impregnation with the liquid electrolyte. With the present invention, however, accurate cathode vs. anode alignment can be achieved easily and accurately, because alignment can be carried out before impregnation with the liquid electrolyte. Thus, the present invention is greatly effective for the production of a secondary battery using electrodes that are gelled irrespective of whether or not the porous film is gelled.

EXAMPLE

According to the process steps shown in FIG. 1, a polymer secondary battery was prepared in the following manner.

$LiCoO_2$ was provided as a cathode active substance, carbon black and graphite as an electrical conduction aid, and "Kynar Flex 741" (PVDF homopolymer particles made by Elf•Atchem Co., Ltd., having a weight-average molecular weight, Mw, of $5.5 \times 10^5$ and an average particle size of 0.2 µm and soluble in NMP) as a binder. These materials were weighed in such a way that the weight ratio of $LiCoO_2$:carbon black:graphite:binder=90:3:3:4. Further, N-methyl-2-pyrrolidone (NMP) was added in such a way that the weight ratio of NMP:binder=94:6. These materials were stirred together at room temperature to prepare a cathode-forming slurry. This slurry was coated and dried on one side of a 60 µm-thick aluminum foil collector to prepare a single-sided type cathode integrated with the collector. Apart from this, the same slurry was coated and dried on both sides of a 20 µm-thick aluminum foil collector to prepare a double-sided type cathode integrated with the collector.

Mesocarbon microbeads (MCMB) were provided as an anode active substance, carbon black as an electrical conduction aid, and "Kynar Flex 741" as a binder. These materials were weighed in such a way that the weight ratio of MCMB:carbon black:binder=87:3:10. Further, NMP was added in such a way that the weight ratio of NMP:binder=93:7. These materials were stirred together at room temperature to prepare an anode-forming slurry. This slurry was coated and dried on both sides of a 10 μm-thick copper foil collector to prepare an anode integrated with the collector.

"Kynar Flex 741" was provided as polymer particles and "Kynar Flex 2851" (made by Elf•Atchem Co., Ltd. with VDF:HFP=95:5 wt %) as a binder. These materials were weighed and mixed together in such a way that the weight ratio of polymer particles:binder=90:10. Two point four (2.4) parts by weight of an acetone/toluene solvent at a weight ratio of 8.9:1.1 were added per part by weight of mixture. The mixture was then mixed together and dissolved at 30 to 40° C. using a homogenizer, thereby obtaining a slurry. The acetone was used as the first solvent and the toluene as the second solvent. Only the polymer of the binder was dissolved in the slurry while the polymer particles composed of PVDF homopolymer were dispersed in the solution.

Then, this slurry was coated on a polyethylene terephthalate (PET) film using a doctor blade coating technique, and the solvent was thereafter evaporated off in a temperature range of room temperature to 120° C. to obtain a solid electrolyte sheet. This solid electrolyte sheet had a (post-drying) thickness of 30 μm. The porosity was 40% as measured by the Archimedes method.

Figure 2:
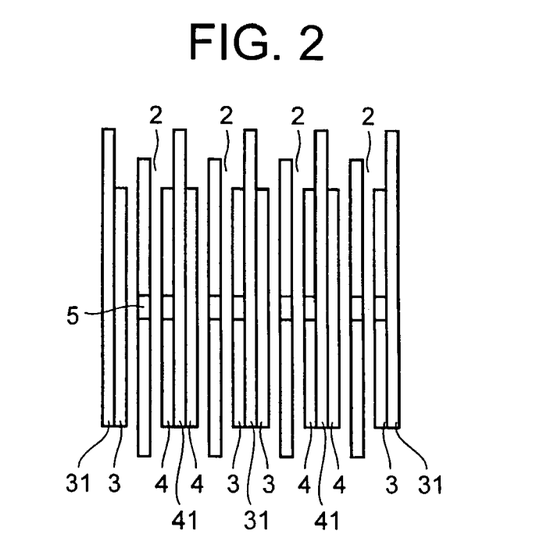
FIG. 2 is a front view showing the structure of a polymer secondary battery produced according to the invention.

Then, the cathode, anode and porous film were each cut to a substantially rectangular sheet. A hot-melt adhesive (ethylene-methacrylic acid copolymer) was coated on the vicinity of the center of each of the cathode and anode sheets. The area coated with the adhesive accounted for 0.05 to 0.5% by area of each sheet surface. As depicted in FIG. 2, the respective sheets were then aligned and stacked one upon another in the order of cathode., porous film, anode, porous film, cathode, . . . in such a way that the double-sided type cathodes were found at both ends of the battery assembly. Pressure was applied to the assembly while it was heated to 110° C. for temporal fixation with the aforesaid adhesive, thereby obtaining a multilayer structure. The number of porous films in the multilayer structure was 10.

Then, aluminum and nickel wires were welded to cathode and anode tabs, respectively, to take out leads. Thereafter, the multilayer structure was immersed in a liquid electrolyte for impregnation. For this liquid electrolyte, 1M $LiPF_6$/EC+DMC where the volume ratio of EC:DMC=1:2 was used. Then, excessive electrolyte was removed from the multilayer structure, after which the multilayer structure was sealed up in an aluminum-laminated pack. The pack was finally pressed at 70 to 90° C. for thermocompression of the sheets in the multilayer structure, thereby obtaining a polymer secondary battery.

In this polymer secondary battery, the binders contained in the cathode and anode were gelled by impregnation with the liquid electrolyte.

COMPARATIVE EXAMPLE

A cathode sheet containing $LiCoO_2$ as a cathode active substance, acetylene black as an electrical conduction aid, "Kynar Flex 2801" with VDF:HFP=90:10 wt % as a binder and DBP as a plasticizer was prepared using a doctor blade coating technique. Likewise, an anode sheet containing mesocarbon microbeads (MCMB) as an anode active substance, acetylene black as an electrical conduction aid, the same "Kynar Flex 2801" as a binder and DBP as a plasticizer was prepared by a doctor blade coating technique. Moreover, a porous film containing $SiO_2$ as an inorganic filler, DBP as a plasticizer and the same. "Kynar Flex 2801" as a binder was prepared using a doctor blade coating technique.

Then, the cathode, anode and porous film were each cut to a substantially rectangular sheet. The respective sheets were stacked one upon another in the order of cathode, porous film and anode, and pressed at 130° C. for thermocompression. After the members were integrated into a single assembly, the assembly was thermocompressed at 100 to 130° C. with collectors located at both its ends, thereby obtaining a multilayer structure. In this comparative example, an 80 μm-thick aluminum expanded metal coated with a slurry comprising a mixture of carbon and an ethylene-acrylic acid copolymer was used for the cathode collector and a 30 μm-thick copper expanded metal coated with the same slurry was used for the anode collector.

Then, aluminum and nickel wires were welded to cathode and anode tabs, respectively, to take out leads. Following this, the multilayer structure was immersed in hexane thereby extracting the plasticizer DBP therefrom. After drying, the multilayer structure was immersed in the same liquid electrolyte as in the aforesaid example for impregnation. Then, excessive electrolyte was removed from the multilayer structure. Finally, the multilayer structure was sealed up in an aluminum-laminated pack, thereby obtaining a polymer secondary battery.

Figure 3:
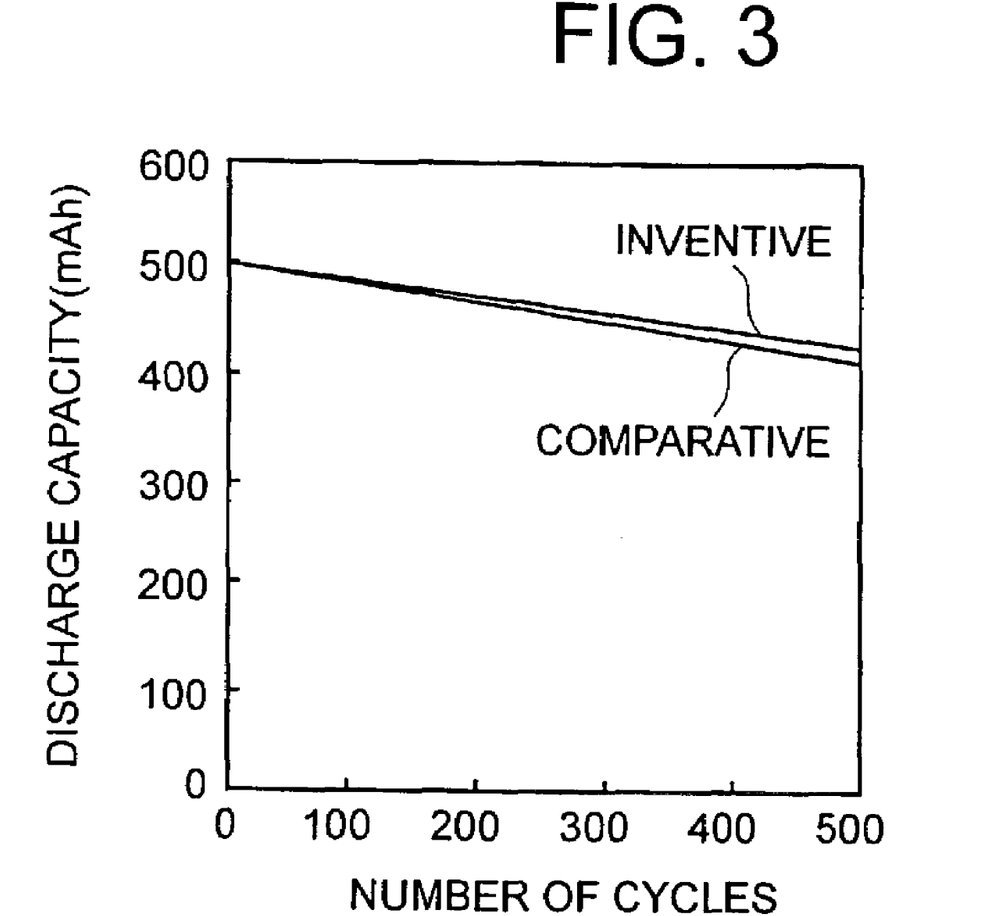
FIG. 3 is a graph showing the cycle characteristics of batteries obtained in the inventive and comparative examples.

Batteries were prepared in the same manner as mentioned above, 50 according to the inventive example and 50 according to the comparative example. How many batteries suffered from internal shorting was examined. For each shorting-free battery, the average ratio between 2C discharge capacity (capacity upon discharged at a constant current of 800 mA) and 0.2C discharge capacity (capacity upon discharged at a constant current of 80 mA) was found. The results are reported in Table 1. The cycle performance of typical batteries is plotted in FIG. 3.

TABLE 1

|  | Ratio of Shorting | 2 C Discharge Capacity/ 0.2 C Discharge Capacity |
|---|---|---|
| Example | 5/50 | 0.9 |
| Comp. Ex. | 25/50 | 0.9 |

From Table 1, it is found that the batteries according to the example are lower in the ratio of shorting than the comparative batteries. It is also found that the inventive batteries are equivalent in terms of the ratio between 2C discharge capacity and 0.2C discharge capacity to the comparative batteries; the same rate performance as obtained so far in the art is achievable.

From charge-and-discharge experimentation, it is found that the inventive batteries have satisfactory reliability because any capacity deterioration is not observed at all. However, the comparative batteries suffered from shorting.

ADVANTAGES OF THE INVENTION

According to the present invention, it is possible to produce a thin and lightweight secondary battery in a easy manner.

We claim:

1. A process of producing a secondary battery comprising, in order:
   providing for a cathode, an anode and a porous film,
   aligning a surface of said cathode and a surface of said anode with said porous film and fixing a part of said surface of said cathode and a part of said surface of said anode to said porous film,
   immersing said cathode, said anode and said porous film in a liquid electrolyte, and integrating said cathode and said anode with said porous film.

2. The secondary battery production process according to claim 1, wherein said porous film contains a polymer, at least a part of which is gelled by immersion in said liquid electrolyte into a solid electrolyte.

3. The secondary battery production process according to claim 1, wherein each of said cathode and said anode contains as a binder for binding together an electrode active substance a polymer, at least a part of which is gelled by immersion in said liquid electrolyte.

4. The secondary battery production process according to claim 1, wherein said cathode and said anode contain polyvinylidene fluoride as a binder for binding together an electrode active substance.

5. The secondary battery production process according to claim 1, wherein a hot-melt adhesive is used when fixing a part of said surface of said cathode and a part of said surface of said anode to said porous film.

6. The secondary battery production process according to claim 1, wherein said cathode and said anode are integrated with a collector comprising a metal foil.

7. A secondary battery production process as claimed in claim 1, which is used for production of a lithium ion secondary battery.

8. The secondary battery production process according to claim 1, wherein said fixing a part is fixing only a central part.

9. The secondary battery production process according to claim 1, wherein an adhesive is used for fixing a part of said surface of said cathode and a part of said surface of said anode to said porous film.

10. The secondary battery production process according to claim 9, wherein the percentage of the area coated with said adhesive relative to the surface area of said anode or said cathode or said porous film, coated with said adhesive following compression is from 0.001% to 1%.

11. The secondary battery production process according to claim 1, wherein said porous film comprises polymer particles and a polymer binder.

12. The secondary battery production process according to claim 11, wherein said porous film has a thickness of up to 60 µm.

13. The secondary battery production process according to claim 12, wherein said thickness is up to 40 µm.

14. The secondary battery production process according to claim 13, where said thickness is up to 15 µm.

15. The secondary battery production process according to claim 11, wherein said polymer particles have an average particle size of 0.1 to 0.5 µm.

16. The secondary battery production process according to claim 15, wherein said particle size is 0.1 to 0.4 µm.

17. The secondary battery production process according to claim 1, wherein the porous film has a thickness of 5 to 100 µm prior to immersing in the liquid electrolyte.

18. The secondary battery production process according to claim 17, wherein said thickness is 5 to 60 µm.

19. The secondary battery production process according to claim 18, wherein said thickness is 10 to 40 µm.

20. The secondary battery production process according to claim 19, wherein said thickness is less than 25 µm.

21. The secondary battery production process according to claim 1, wherein the porous film has a porosity of at least 35% as measured in a dry state before immersing in the liquid electrolyte.

22. The secondary battery production process according to claim 1, wherein the porous film has an average pore diameter of 0.005 to 0.5 µm.

23. The secondary battery production process according to claim 22, wherein said average pore diameter is 0.01 to 0.3 µm.

24. The secondary battery production process according to claim 10, wherein the percentage is 0.05% to 0.5%.

25. The secondary battery production process according to claim 1, wherein said fixing is carried out without an adhesive.

26. The secondary battery production process according to claim 1, wherein the integration is carried out by compression.

27. The secondary battery production process according to claim 1, wherein the fixing is temporal fixation.

28. A process of producing a secondary battery comprising, in order:
    providing for a cathode, an anode and a porous film;
    aligning a surface of said cathode and a surface of said anode with said porous film;
    fixing a part of said surface of said cathode and a part of said surface of said anode to said porous film; and
    immersing said cathode, said anode and said porous film in a liquid electrolyte.

* * * * *

UNITED STATES PATENT AND TRADEMARK OFFICE
CERTIFICATE OF CORRECTION

PATENT NO. : 7,615,084 B2  Page 1 of 1
APPLICATION NO. : 10/347744
DATED : November 10, 2009
INVENTOR(S) : Iijima et al.

It is certified that error appears in the above-identified patent and that said Letters Patent is hereby corrected as shown below:

On the cover page,

Item [*] Notice: Subject to any disclaimer, the term of this patent is extended or adjusted under 35 USC 154(b) by (1162) days Delete the phrase "by 1162 days" and insert -- by 1535 days --

Signed and Sealed this

Twenty-fourth Day of August, 2010

David J. Kappos
*Director of the United States Patent and Trademark Office*